United States Patent [19]
Zakryk

[11] Patent Number: 5,701,749
[45] Date of Patent: Dec. 30, 1997

[54] WATER COLLECTION AND DISPENSING MACHINE

[76] Inventor: John M. Zakryk, 5961 S.W. 19th Street, Plantation, Fla. 33317

[21] Appl. No.: 641,186

[22] Filed: Apr. 30, 1996

[51] Int. Cl.$^6$ .............................. F25D 17/06; F25D 21/14; B67D 5/62
[52] U.S. Cl. .................................. 62/93; 62/389; 62/285
[58] Field of Search ........................... 62/93, 389, 391, 62/272, 285

[56] References Cited

U.S. PATENT DOCUMENTS

| | | | |
|---|---|---|---|
| 3,675,442 | 7/1972 | Swanson | 62/285 |
| 4,182,132 | 1/1980 | Nasser et al. | 62/93 |
| 5,106,512 | 4/1992 | Reidy | 210/744 |
| 5,149,446 | 9/1992 | Reidy | 210/744 |
| 5,555,732 | 9/1996 | Whiticar | 62/3.4 |

*Primary Examiner*—William Doerrler
*Attorney, Agent, or Firm*—Malloy & Malloy, P.A.

[57] ABSTRACT

A water collection and dispensing machine having a primary housing with an air inlet and an air outlet, an air blower structured to draw air into the primary housing through the air inlet and push air out of said primary housing through the air outlet. The water collection and dispensing machine further includes an evaporator coil structured to cycle a cold refrigerant liquid therethrough, the evaporator coil being disposed in line with the air inlet so that the air drawn into the primary housing through the air inlet passes thereover and moisture therefrom condenses on an exterior surface of the evaporator coil so that it may be collected in the form of water droplets, filtered to eliminate contaminants, and dispensed for convenient consumption by a user.

13 Claims, 2 Drawing Sheets

WATER COLLECTION AND DISPENSING MACHINE

BACKGROUND OF THE INVENTION

1. Field of the Invention

The present invention relates to a water collection and dispensing machine which is capable of effectively and efficiently collecting drinkable water from the atmosphere in an assembly that is substantially compact and quiet, yet capable of producing sufficiently large quantities of water to satisfy normal consumption requirements.

2. Description of the Related Art

The availability of fresh, purified drinking water is highly desirable in virtually every environment and circumstance. For example, individuals in homes and offices often install complex and expensive filtration systems, or buy small individual bottles of spring water for personal consumption purposes. One of the most common manners in which purified drinking water is made available, however, involves the utilization of large 5-gallon water bottles in conjunction with a cooler assembly.

While the use of the larger bottles with a cooler is generally more convenient to implement than other methods of providing purified water, anyone who has been charged with the task of replacing an empty water bottle is very aware of the difficulties and inconveniences associated with the use of conventional bottled water cooler systems. First of all, the large bottles of water are generally heavy and as such, quite difficult for any person to lift and position atop of the cooler. Moreover, the bottle must not merely be lifted onto a top of the cooler, but rather, it must be turned upside-down, with the spout open, so as to permit for the availability of the water contained therein. Inevitably, individuals changing the water bottle spill quantities of water, which may be hazardous and make for a slippery environment, or end up getting hurt while changing the bottle due to the heavy weight that must be manipulated.

In addition to the substantial difficulties associated with reloading conventional water coolers, the cost associated with the frequent purchase of the large bottles can add up and become quite expensive, especially when aggregated with the electrical cost associated with operating the cooler. Further, if limited space is available, the large inverted water bottle, which has a generally unattractive appearance, takes up a lot of excess space and will generally not permit the use of the space over the water cooler for alternative purposes.

As such, it would be highly beneficial to provide a water cooler type assembly which is capable of providing sufficient quantities of purified, drinkable water, without requiring that a large water bottle be implemented to supply the water. Such a device would preferably take up less space, would be more cost effective, would not require water bottle replacement, and would not require frequent water deliveries to ensure that water is always available for drinking purposes.

In the past, others have attempted to provide various complex and elaborate mechanisms for producing potable water from the atmospheric air. Generally, such devices are designed for use at locations where the water supply is limited and individuals need drinking water to survive. As a result, cost, size, noise, and other ergonomic features which would make the devices convenient for use on an everyday basis are not primary considerations in their design. Accordingly, such devices could not be effectively utilized in a home or office setting in order to practically and effectively replace the use of conventional bottled water coolers.

In addition to those larger, highly complex devices, other devices for the extraction of potable water from the atmosphere such as that disclosed in the patent to Engel et al. (U.S. Pat. No. 5,259,203) have attempted to provide a more readily useable device. Such devices, however, still do not achieve maximum efficiency and effectiveness for use and are not as suited for use in an office or home environment. For example, such devices generally rely on a gravity feed, and as a result must be mounted in a generally elevated orientation to permit effective access to a spigot thereof. Moreover, fluid which is ready to be dispensed may remain within dispensing tubing or a reservoir for extended periods of time and as a result, may become stagnate or otherwise contaminated. Additionally, such devices often have limited capacity and are quite noisy which tends to diminish their desirability of use within an office or home environment.

There therefore still a substantial need in the art for an effective and efficient water cooling type system which has a sufficient water capacity for effective use, maintains water fresh and readily available at all times, is substantially inexpensive to operate, and is conveniently useable in a home or office environment as a result of its compact nature, relatively quiet operation, and convenient dispensing.

SUMMARY OF THE INVENTION

The present invention is directed towards a water collection and dispensing machine structured to provide a quantity of purified, drinkable water, for convenient consumption. The water collection dispensing machine includes a primary housing, which is preferably somewhat compact and has an air inlet and an air outlet. Specifically, the air outlet is disposed at generally a bottom of the housing to provide for convenient, out of the way release of air therethrough. Further, the water collection and dispensing machine includes an air blower. The air blower is structured to draw air into the primary housing through the air inlet, and thereby create a positive pressure condition within the primary housing. That positive pressure that is created within the primary housing in turn pushes air through the primary housing and down and out of it through the air outlet in a relatively quiet fashion.

Additionally, the water collection and dispensing machine includes dehumidifier refrigerant means. Specifically, the dehumidifier refrigerant means are structured and disposed to convert a refrigerant gas into a cold refrigerant liquid. That cold refrigerant liquid is then to be cycled through a fin and tube evaporator coil disposed within the primary housing. The fin and tube evaporator coil is specifically structured so that the air that is drawn into the primary housing through the air inlet will pass thereover as it flows through the primary housing to the air outlet. As a result, moisture from the air passing over the fin and tube evaporator coil condenses on an exterior of the coil where it can be collected. The fin and tube evaporator coil, which is structured to include a substantially large surface area without taking up a substantial amount of space within the primary housing thereby collects a substantial amount of moisture in the form of water droplets which are collected by fluid collection means. The water collected by the fluid collection means is then filtered through filtration means prior to dispensing so that the dispensed water is purified and drinkable.

It is an object of the present invention to provide a water collection and dispensing machine which has increased fluid retention capacity and is convenient to utilize in a work or home environment.

A further object of the present invention is to provide a water collection and dispensing machine which is substantially compact and quiet during operation.

Still another object of the present invention is to provide a water collection and dispensing machine that does not require the use of large water bottles while still providing sufficient quantities of fluid for normal consumption.

Yet another object of the present invention is to provide a water collection and dispensing machine which maintains water to be dispensed cool without requiring a second refrigerant system.

A further object of the present invention is to provide a water collection and dispensing machine which effectively circulates water therethrough to ensure that water to be dispensed is not stale and has not remained stagnate for extended periods of time.

Also an object of the present invention is to provide a water collection and dispensing machine which dispenses substantially clean, purified water without requiring connection with a conventional water source such as a tap or water bottle in order to provide quantities of purified water.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
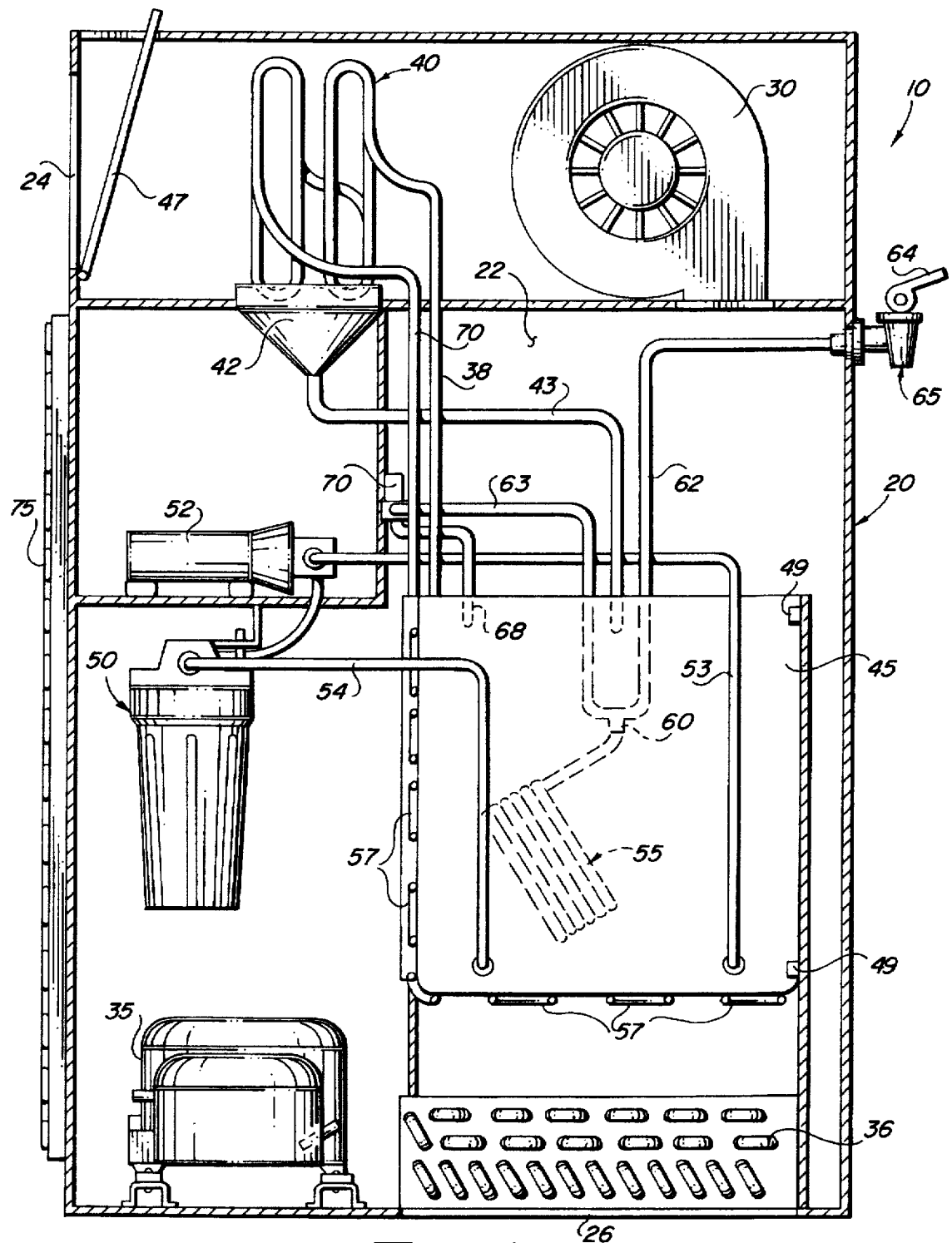
FIG. 1 is a front cross-sectional view of the water collection and dispensing machine of the present invention.
Figure 2:
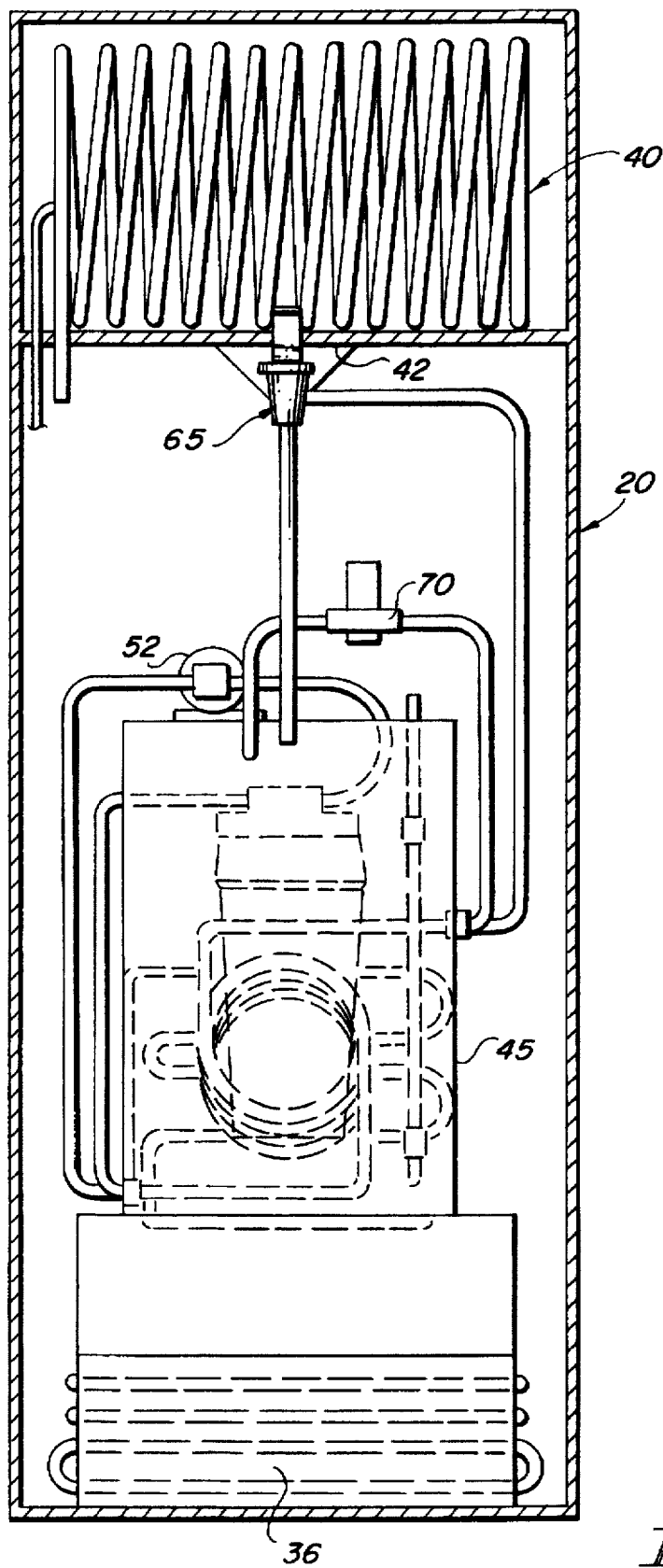
FIG. 2 is a side cross-section view of the water collection and dispensing machine of the present invention.

The present invention is directed towards a water collection and dispensing machine, generally indicated as 10. In particular, the water collection and dispensing machine 10 is structured to draw in atmospheric air, and convert the humidity contained therein into purified, drinkable water. As such, included as part of the water collection and dispensing machine 10 is a primary housing 20. This primary housing 20, which may be formed of aluminum, plastic or any other suitable, rigid or semi-rigid material is preferably somewhat compact and contains the remaining components of the water collection and dispensing machine 10 conveniently therein. Accordingly, the primary housing 20 provides the attractive exterior appearance for the water collection and dispensing machine 10 and its finished and compact nature facilitates the positioning of the water collection and dispensing machine 10 in a convenient, out of the way, space maximizing location.

The primary housing 20, which preferably includes a rectangular type configuration, includes generally an open interior area 22, an air inlet 24, and an air outlet 26. In use, air is structured to flow into the primary housing 20 through the air inlet 24, pass through the interior area 22 and exit through the air outlet 26. Further, in the preferred embodiment, the air inlet is disposed generally at an upper, rear portion of the primary housing 20, such as at a side of the primary housing 20 facing a wall against which the primary housing 20 is disposed. Accordingly, air can effectively be drawn into the primary housing 20 through the rear thereof, while still achieving generally quiet introduction of the air into the primary housing 20 as the noise at the air inlet is directed towards a wall and is thereby somewhat muffled.

Furthermore, in the preferred embodiment, the air outlet 26 is disposed at a base or bottom portion of the primary housing 20. As such, the air drawn in through the air inlet 24 flows completely through the primary housing 20 and can be efficiently utilized for a variety of functions without requiring significant redirection of its flow, and the air exiting the primary housing 20, which is generally somewhat warm, is more readily dissipated beneath the primary housing 20. Further, much like results with the positioning of the air inlet 24 towards a wall surface, the positioning of the air outlet 26 generally against the floor on which the primary housing 20 is disposed functions to somewhat muffle noises within the primary housing 20 and helps to contribute to the overall quite operation of the water collection and dispensing machine 10.

Disposed within the primary housing 20 and structured to draw air from the atmosphere into the primary housing 20 is an air blower 30. The air blower 30 may be any convention type of extractor type of blower which draws the air into the primary housing 20 through the air inlet 24, and in turn creates a positive pressure condition within the interior 22 of the primary housing 20. It is that positive pressure that pushes the air back out through the air outlet 26 against the floor, and further facilitates the exceptionally quite operation of the water collection and dispensing machine 10.

Further contained within the primary housing 20 are dehumidifier refrigerant means. The dehumidifier refrigerant means are specifically structured and disposed to convert a refrigerant gas into a cold refrigerant liquid. As such, in the preferred embodiment the dehumidifier refrigerant means includes a compressor 35. The compressor 35 is structured to compress a refrigerant gas contained therein and thereby form a very hot gas. This very hot gas is then transferred into a condenser coil 36. The condenser coil 36 receives the hot gas from the compressor 35 and is disposed directly in-line with the air outlet 26 so that cooled air which exits the primary housing 20 through the air outlet 26 necessarily passes over the condenser coil 36. As a result, a substantial quantity of heat is drawn off of the condenser coil 36 by the cool air flow, resulting in the cooling of the very hot gas into a cool liquid. Further connected with the condenser coil 36 as part of the dehumidifier refrigerant means is a cap tube 38, or optional TXV. The cap tube 38 is connected in fluid flow communication with the condenser coil 36 and permits the cooled liquid to further expand as it flows therethrough and accordingly create a cold liquid. The cold liquid then flows from the cap tube 38 into an evaporator coil 40.

Looking specifically to the evaporator coil 40, it is preferably fin and tube evaporator coil connected in fluid flow communication with the cap tube 38 and structured to cycle the cold liquid therethrough. As a result of this specific structure of the fin and tube evaporator coil 40, the cold refrigerant liquid is maintained therein for a substantial period of time and the overall exterior surface area of the evaporator coil 40 is maximized. Preferably, the fin and tube evaporator coil 40 is formed of a metallic material, such as copper so that the cold liquid flowing therethrough makes the surface of the evaporator coil 40 substantially cold as well. Moreover, the evaporator coil 40 is preferably disposed in line with the air inlet 24 in the primary housing 20. As such, upon air being drawn into the primary housing 20 by the air blower 30 it passes over the evaporator coil 40. Due to the cold temperature of the evaporator coil 40, as the air flow comes into contact with the exterior surface thereof, moisture contained within the air condenses on the evaporator coil 40 in the form of water droplets.

Disposed beneath the evaporator coil 40, and included as part of the fluid collection means of the present invention, is a drip tray 42. The drip tray 42 is disposed beneath an entire surface of the evaporator coil 40 such that as the moisture, which was collected from the air on the exterior surface of the evaporator coil 40 drips down the evaporator in the form of the water droplets, those water droplets are collected by the drip tray 42. The drip tray 42 is in turn connected by an elongate fluid conduit 43 with a generally large fluid reservoir 45. The fluid reservoir 45 preferably has a somewhat large capacity to ensure that sufficient quantities of water are available for dispensing purposes. Also, the fluid reservoir 45 can be disposed in line with the air flow passing through the primary housing 20 such that the air, which has been cooled as it passed over the evaporator coil 40, can function to cool the water within the fluid reservoir 45.

In order to provide purified, drinkable water for consumption by individuals, the water collection and dispensing machine 10 further includes filtration means. The filtration means are structured to ensure that all of the water collected is free from contaminants, which may be present in the air as it enters the primary housing 20. In this regard, as an initial means of filtration an air intake filter 47 is disposed generally over the air inlet 24. Accordingly, utilizing the air inlet filter 47 a substantial amount of particulate are removed from the air, thereby minimizing the contaminants which will be present in the water droplets which are drawn from the air. Still, however, as the water is collected in the drip tray 42 and passed into the fluid reservoir 45, some contaminates may still be present within the water. As a result, the filtration means of the present invention further includes a water filter 50 contained within the primary housing 20. The water filter 50 is structured to receive water therethrough as a result of a pump 52 also contained within the primary housing 20. In particular, the pump 52 through an elongate conduit 53 draws water from the fluid reservoir 45 and pumps it into the water filter 50. The water filter 50 itself may include any kind of conventional water filtration and purification means, and furthermore, in the preferred embodiment will also include UV light to provide further purification. From the water filter 50, a further conduit 54 permits the water to be pumped from the water filter 50 into a delivery coil 55. The delivery coil 55 is structured to contain a quantity of filtered water in a ready to dispense orientation.

As it is preferred that the water dispensed from the water collection and dispensing machine 10 of the present invention be cool, further included within the primary housing 20 are means to maintain that water cool. Although a second refrigeration system may also be incorporated within the primary housing 20, in the preferred embodiment the fluid reservoir 45 is lined with a plurality of thermal electric cold plates 57. These thermal electric cold plates 57 function to maintain the water in the fluid reservoir 45 substantially cool without requiring the added noise, cost and energy of a separate refrigeration system solely for water cooling purposes. Additionally, so as to maximize the cooling effects of the cold plates 57, the delivery coil 55 is preferably structured to be maintained submerged beneath the water level within the fluid reservoir 45. Moreover, the delivery coil 55 will preferably be constructed of a temperature conductive material, such as copper so that the purified water maintained therein is maintained cool as a result of its presence in the cool environment of the fluid reservoir 45.

Looking further to the delivery coil 55, it is preferably a substantially elongate coiled tube so that a substantial quantity of the purified water may be maintained therein in a ready to dispense orientation. Further, the outlet of the delivery coil 55 preferably includes a Y connection 60. The Y connector 60 is structured to permit water flow either to a dispensing spigot 55 or a return tube 68. Looking first to the dispensing spigot 55, it is connected to the delivery coil 55 by an elongate conduit 62. As a result of the pump 52 which pumps the water through the water filter 50 and into the delivery coil 55, the purified ready to dispense water is pumped up the conduit 62 to the dispensing spigot 55 and is ready to be dispensed when needed. Much like conventional water dispensing devices, the dispensing spigot 65 is preferably a conventional on/off type tap wherein a lever 64 is actuated so as to open up a valve within the dispensing spigot 65 and permit water to flow therefrom for effective dispensing. It should be understood, however, that any alternative means of dispensing could equivalently be employed. Extending from a second outlet of the Y connector 60 is a secondary conduit 63. This second conduit 63 is connected in fluid flow communication with the return tube 68 through valve means 70. The valve means 70 are specifically structured and disposed to open on a predetermined, regulated basis in order to permit selective cycling of the quantity of filtered water contained within the delivery coil 55 into the return tube 68. In particular, the return tube 68 is connected in fluid flow communication back to the fluid reservoir 45. As such, if after a predetermined period of time or after a predetermined number of uses purified water has remained within the delivery coil 55 for an extended period of time, that water may be cycled back into the fluid reservoir 45. Such cycling ensures that the quantity of water that is ready to be dispensed within the delivery coil 55 is always freshly filtered and has not been allowed to be maintained within the delivery coil 45 for an extended period of time where after it may become stagnate or otherwise less desirable to drink. In the preferred embodiment the valve means 70 includes a timed solenoid valve structured to open based upon a predetermined timed cycle. For example, the solenoid valve 70 may be structured to either open every few minutes and direct the fluid back into the fluid reservoir 45, or to open if fluid has not been dispensed after a predetermined number of minutes through the dispensing spigots 65. Accordingly, water can be maintained constantly filtered.

As a further feature of the present invention, also included within the fluid reservoir 45 are preferably fluid level detection means 49. Specifically, the fluid level detection means 49 are structured and disposed to detect whether a level of water within the fluid reservoir 45 is too high or too low and correspondingly regulate operation of the machine. For example, if the water level drops too low it may serve as an indication for the shutdown of the thermal cold plates 57, such that energy is not wasted, and can initiate an extended water producing cycle to refill the fluid reservoir 45 back to an acceptable level. More commonly, however, the fluid level detection means will preferably function to detect when a fluid level is reaching the maximum capacity of the fluid reservoir 45. As a result, when that water level is detected as being too high, the air blower 30 and dehumidifier refrigerant means will not need to operate to produce further water. Such a configuration saves electricity and ensures that operation does not result in an overflow of the fluid reservoir 45. Furthermore, so as to maintain maximum efficiency of the dehumidifier refrigerant means, it also includes recycling means. Specifically, the recycling means are structured to recycle the cold liquid from the evaporator coil 40 and direct it back to the compressor 35 in the form of refrigerant gas once again. As such, the recycling means includes a return conduit 70 which directs the cold liquid 40 from the evaporator coil into the compressor 35, permitting the cold liquid to return to its normal refrigerant gas state where after the cycle may repeat itself beginning at that necessary 35. Additionally, if necessary, the back surface of the primary housing 20 may include a chill refrigerant system static condenser 75. This static condenser 75 may be used either as a condenser coil for a secondary refrigeration cycle used to cool the water within the fluid reservoir 45, or to provide for the return of the cold liquid from the evaporator coil 40 to the condenser 35 therethrough so as to further facilitate its return to its conventional refrigerant gas state.

It is therefore seen that given the specific structure of the water collection and dispensing machine 10 of the present invention, the production of water is substantially facilitated, without requiring large water bottles be implemented, in a substantially quite and efficient manner.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A water collection and dispensing machine comprising:

a primary housing, said primary housing including an air inlet and an air outlet, said air outlet being disposed at generally a bottom of said housing, an air blower structured to draw air into said primary housing through said air inlet and thereby create a positive pressure within said primary housing which pushes air down and out of said primary housing through said air outlet in a relatively quiet fashion, dehumidifier refrigerant means structured and disposed to convert a refrigerant gas into a cold refrigerant liquid, a fin and tube evaporator coil structured to cycle said cold refrigerant liquid therethrough, said fin and tube evaporator coil being disposed such that the air drawn into said primary housing through said air inlet passes over said fin and tube evaporator coil and moisture therefrom condenses on an exterior of said fin and tube evaporator coil, said fin and tube evaporator coil being structured to include a substantially large surface area without taking up a substantial amount of space within said housing fluid collection means structured to collect said moisture, in the form of water droplets, from said fin and tube evaporator coil, filtration means structured and disposed to filter water collected by said fluid collection means prior to dispensing, said fluid collection means including a fluid reservoir, and a plurality of thermal electric cold plates lining said fluid reservoir and structured and disposed to maintain the water within said fluid reservoir cold.

2. A water collection and dispensing machine comprising:

a primary housing, said primary housing including an air inlet and an air outlet, said air outlet being disposed at generally a bottom of said housing, an air blower structured to draw air into said primary housing through said air inlet and thereby create a positive pressure within said primary housing which pushes air down and out of said primary housing through said air outlet in a relatively quiet fashion, dehumidifier refrigerant means structured and disposed to convert a refrigerant gas into a cold refrigerant liquid, a fin and tube evaporator coil structured to cycle said cold refrigerant liquid therethrough, said fin and tube evaporator coil being disposed such that the air drawn into said primary housing through said air inlet passes over said fin and tube evaporator coil and moisture therefrom condenses on an exterior of said fin and tube evaporator coil, said fin and tube evaporator coil being structured to include a substantially large surface area without taking up a substantial amount of space within said housing fluid collection means structured to collect said moisture, in the form of water droplets, from said fin and tube evaporator coil, filtration means structured and disposed to filter water collected by said fluid collection means prior to dispensing, said fluid collection means including a fluid reservoir, said filtration means including a delivery coil structured to contain a quantity of filtered water in a ready to dispense orientation, a dispensing spigot connected with said delivery coil and structured to selectively dispense the quantity of water from said delivery coil, a return tube, said delivery coil being connected in fluid flow communication with said dispensing spigot and said return tube, and said return tube being connected in fluid flow communication with said fluid reservoir and including valve means structured and disposed to open on a predetermined, regulated basis in order to selectively cycle said quantity of filtered water back into said fluid reservoir and thereby ensure that water in said delivery coil is fresh.

3. A water collection and dispensing machine as recited in claim 2 wherein said fluid collection means includes a drip tray disposed beneath said evaporator coil and connected in fluid flow communication with said fluid reservoir.

4. A water collection and dispensing machine as recited in claim 3 wherein said filtration means comprises:

a pump structured to draw water from said fluid reservoir, and a water filter structured to receive the water drawn by said pump therethrough for subsequent filtration thereof.

5. A water collection and dispensing machine as recited in claim 4 wherein said water filter further includes a UV light structured to further purify water flowing through said water filter.

6. A water collection and dispensing machine as recited in claim 4 wherein said fluid reservoir is lined with a plurality of thermal electric cold plates structured and disposed to maintain the water within said fluid reservoir cold.

7. A water collection and dispensing machine as recited in claim 6 wherein said delivery coil is disposed in said fluid reservoir such that the quantity of filtered water contained therein is maintained cold.

8. A water collection and dispensing machine as recited in claim 7 wherein said delivery coil is made of copper.

9. A water collection and dispensing machine as recited in claim 4 wherein said valve means includes a timed solenoid valve structured to open based upon a predetermined timed cycle.

10. A water collection and dispensing machine as recited in claim 3 further including fluid level detection means structured and disposed to detect whether a level of water in said fluid reservoir is too high or too low and correspondingly regulate operation of the machine.

11. A water collection and dispensing machine as recited in claim 2 wherein said dehumidifier refrigerant means comprises:

a compressor structured to compress the refrigerant gas into a very hot gas, a condenser coil structured to receive said very hot gas therein from said compressor, said condenser coil being disposed in line with said air outlet such that cooled air exiting said primary housing through said air outlet passes over said condenser coil, draws off a quantity of heat, and cools said very hot gas to a cool liquid, a capillary tube connected in fluid flow communication between said condenser coil and said evaporator coil, and structured to permit said cooled liquid to expand further and create a cold liquid that flows into said evaporator coil and makes said evaporator coil sufficiently cold to cause moisture form the air passing thereover to condensate thereon, and recycling means structured to recycle said cold liquid from said evaporator coil back into said compressor.

12. A water collection and dispensing machine as recited in claim 2 further including an air intake filter disposed over said air inlet.

13. A water collection and dispensing machine as recited in claim 2 wherein said air inlet is disposed at generally an upper, rear portion of said housing.

* * * * *